ABSTRACT OF THE DISCLOSURE

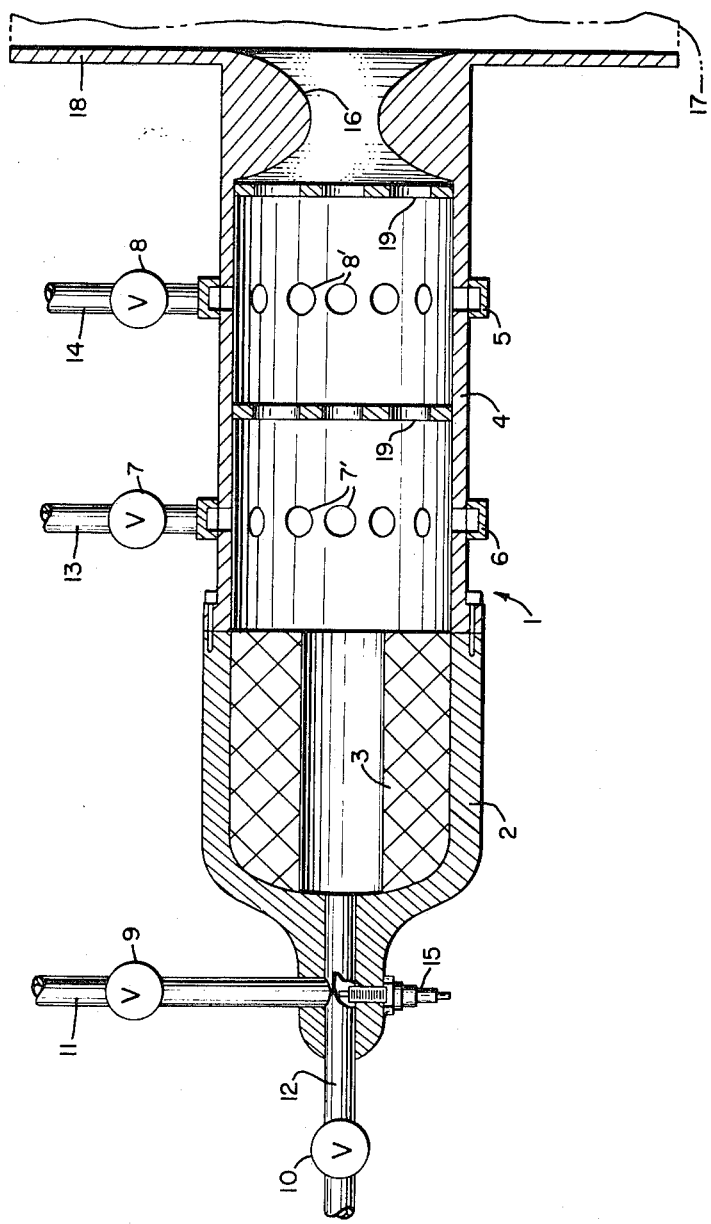
INVENTORS
DONALD R. MATTHEWS
ALLEN L. HOLZMAN 3,716,342
GENERATION OF CARBON DIOXIDE HAVING A POPULATION INVERSION
Donald R. Matthews, San Jose, and Allen L. Holzman, Palo Alto, Calif., assignors to United Aircraft Corporation, East Hartford, Conn.
Filed Feb. 25, 1969, Ser. No. 802,013
Int. Cl. B01j 7/00
U.S. Cl. 23—281                    5 Claims

Tetrahcyanoethylene is burned with a stoichiometric amount of oxygen to produce combustion products consisting essentially of high temperature carbon dioxide and nitrogen. These combustion products are mixed with additional nitrogen to reduce the temperature of the combustion products and to take advantage of the efficient energy transfer between excited nitrogen and carbon dioxide.

In addition, small amounts of hydrogen may also be burned to produce water which increases the rate of de-excitation of the lower vibrational levels of carbon dioxide molecules and thereby increase the efficiency of a lasing process. The hot gases so produced may then be expanded into and caused to flow continuously through a laser tube, whereby a continuous wave laser may be operated.

BACKGROUND OF THE INVENTION

When lasers were initially developed it was believed that high-power outputs could only be obtained with solid state devices which devices were limited to operating in a pulsed mode. At present, however, the world's most powerful continuous wave laser is a carbon dioxide laser which produces an infrared beam with an output power of 8.8 kilowatts. In order to operate a continuous carbon dioxide laser, it is necessary to generate a carbon dioxide gas stream in which there is a population inversion of carbon dioxide molecules and to cause this gas stream to flow through a laser cavity. Various methods have been used to excite the carbon dioxide molecules. One approach has been to cause a carbon dioxide stream to flow through a quartz laser tube which tube is heated externally by flame produced by burning carbon monoxide.

Another approach has been to excite carbon dioxide by mixing it with nitrogen that has been exposed to an electric discharge. In this connection, it has been discovered that nitrogen is an effective medium for exciting carbon dioxide molecules to the upper laser level since the energy of excitation of $N_2$ is almost equal to the energy of excitation of $CO_2$. When carbon dioxide lases, the carbon dioxide transfers from the upper laser level to the lower laser level. The carbon dioxide in the lower laser level must then be de-excited to the ground state before it can be re-excited by the nitrogen to the upper laser level. The presence of water vapor aids in this de-excitation process. Both of these systems require an external exciting source and the necessary associated equipment therefor.

In order to avoid the difficulties associated with the laser systems described above, it has been proposed to generate a carbon dioxide-nitrogen gas stream directly by burning cyanogen with oxygen. The products of this combustion would be high temperature carbon dioxide and nitrogen, but the toxic and gaseous nature of cyanogen is such as to render the use of such a system extremely hazardous and difficult.

According to this invention, it has been discovered that a carbon dioxide-nitrogen gas stream having a population inversion of carbon dioxide molecules in the upper laser level can be generated by burning with oxygen a solid fuel element comprising tetracyanoethylene. This material and its synthesis are described in U.S. Pat. No. 3,166,584, Cairns et al., dated Jan. 19, 1965. Tetracyanoethylene is a non-toxic solid material consisting only of carbon and nitrogen ($C_6N_4$) and burns in the presence of oxygen in a char-free manner to produce carbon dioxide and nitrogen.

The combustion products so produced may then be mixed with additional nitrogen to reduce the temperature and trace amounts of water vapor may also be added and the mixture so produced passed through a laser cavity to produce a continuous carbon dioxide laser.

It is accordingly an object of this invention to generate a carbon dioxide-nitrogen gas stream having a population inversion of carbon dioxide molecules in the upper laser level by the combustion of tetracyanoethylene with oxygen.

It is another object of this inventon to provide an apparatus for the generation of such a carbon dioxide-nitrogen gas stream by the combustion of solid tetracyanoethylene.

These and other objects of the invention will be readily apparent from the following description with reference to the accompanying drawing wherein the figure is a cross-section through a combustion chamber for the burning of tetracyanoethylene according to this invention.

DESCRIPTION OF THE INVENTION

Referring now to the drawing, a combustion apparatus 1 for generating a gas stream according to this invention is shown. The combustion apparatus consists of a forward portion 2 adapted to receive a grain 3 of pressed tetracyanoethylene. The forward portion 2 is releasably mounted to the rearward portion 4 which is provided with outlet means 16. Oxygen from a suitable source, not shown, is supplied to the tetracyanoethylene grain 3 through line 12 and variable flow control valve 10. For ignition purposes and optionally for the production of minor amounts of water vapor which enhance the laser efficiency, a gaseous fuel material such as hydrogen or a hydrocarbon for example, and preferably hydrogen, is supplied to the oxygen stream through line 11 and variable flow control valve 9 from a suitable source, not shown. A spark plug 15 or similar hot ignition device can be used to ignite the hydrogen-oxygen mixture to provide initial combustion of the tetracyanoethylene. The rearward portion 4 of the combustion apparatus is provided with a manifold 6 which is supplied with additional oxygen from a suitable source (not shown), through line 13 and valve 7. The ports 7' permit introduction of the oxygen into the combustion apparatus. A similar manifold 5 is located downstream from manifold 6 for supplying nitrogen to the combustion apparatus from a suitable source, not shown, through lines 14, variable flow control valve 8 and ports 8'. Manifold 5 is located sufficiently downstream from manifold 6 such that complete combustion of the tetracyanoethylene with the oxygen has been accomplished prior to the passage of the gas stream past ports 8'. In order to improve mixing of the gas streams and thereby reduce the overall size of the combustion apparatus, it is desirable to place suitable turbulence producing baffles 19 between manifolds 5 and 6 and between manifold 5 and the outlet 16. The combustion apparatus may be provided with a flange 18 which permits the device to be connected to a laser chamber 17 shown in phantom lines.

In operation, valve 10 would be opened to permit a flow of oxygen to the tetracyanoethylene grain 3 and valve 9 would be opened and the hydrogen-oxygen mixture ignited by means 15. This will cause combustion of the tetracyanoethylene 3. Valve 9 may then be closed or minor amounts of hydrogen may be permitted to continue to flow into the combustion chamber to improve the lasing efficiency of the gas stream. The flow rate of the oxygen through valve 10 will determine the mass flow rate of the tetracyanoethylene 3 and valve 10 is adjusted to produce the desired tetracyanoethylene flow rate. The gas stream leaving grain 3 and entering the upstream portion of section 4 will be fuel-rich due to the nature of the combustion process occurring in grain 3. In order to obtain complete combustion of the tetracyanoethylene, addition oxygen is introduced through manifold 6 such that the total amount of oxygen introduced through line 12 and manifold 6 is at least stoichiometric with the mass flow rate of tetracyanoethylene to produce complete combustion to $CO_2$ and $N_2$ and prevent the evolution of unburned carbon in the form of soot. An excess of oxygen can be tolerated and may, in fact, improve lasing efficiency in a manner similar to that of water vapor, however, a hot oxygen rich atmosphere may be corrosive to the combustion chamber and laser apparatus such that it is preferred to operate at substantially stoichiometric conditions. Nitrogen is introduced into the combustion products through manifold 5. In this connection, it is necessary to insure that the tetracyanoethylene has been completely combusted by the oxygen prior to the introduction of the nitrogen through ports 8', since if complete combustion has not occurred, the nitrogen introduced will quench the combustion process and result in the evolution of carbon. Thus, ports 8' should be spaced sufficiently downstream of ports 7' so that the combustion process has ceased by the time the combustion gases flow past ports 8'. Baffle 19 or other similar means may be interposed between manifolds 5 and 6 to increase turbulence and improve the mixing of the oxygen and the uncombusted tetracyanoethylene. Similarly, it is desirable to have good mixing of the nitrogen with the combustion products prior to the departure of the gas stream through outlet 16 and to this effect baffle 19 may be placed between ports 8' and outlet 16. The flow rates of the various gas streams can be adjusted within fairly wide parameters provided that the oxygen is present in amounts which will completely oxidize the tetracyanoethylene to carbon dioxide and nitrogen. The amount of added nitrogen can similarly be varied within fairly wide ranges. Basically it is desirable to have a substantial excess of nitrogen to provide for the re-excitation of the carbon dioxide molecules, but since the introduction of cold nitrogen affects the temperature of the combustion products, the amount of nitrogen added should be selected within the following guidelines. It has been determined that optimum laser activity can be obtained from the carbon dioxide gas stream if the temperature of the gas stream in the laser tube is approximately 1200° K. The laser activity tends to decrease if the gas stream temperature is either higher or lower than this amount. Thus, the amount of nitrogen added preferably should be insufficient to reduce the temperature within the combustion chamber to below about 1200° K. Higher temperatures can, of course, be tolerated since the higher temperature gases can be reduced to a temperature of approximately 1200° K. by appropriate expansion through outlet means 16 into the laser cavity.

In this connection, it is preferable to have a weight ratio of nitrogen to carbon dioxide in the gas stream of at least about 6 and ratios as high as 12 can be used without substantially affecting the lasing efficiency of the exhaust gases.

Gas generators according to this invention have been operated at chamber pressures of approximately 300 p.s.i.a., employing a pressed gain of tetracyanoethylene 1.0" I.D., 2.5" O.D. and 7.5" long in a combustion apparatus having a length of approximately 15". Approximately 30% by weight of the total oxygen is supplied upstream of the tetracyanoethylene grain.

While this invention has been described with respect to certain embodiments thereof, it should not be construed as being limited thereto. Various modifications and substitutions will be readily apparent to workers skilled in the art and can be made without departing from the scope of this invention which is limited only by the following claims wherein:

We claim:

1. A gas generator for generating a stream of gases consisting essentially of carbon dioxide and nitrogen having a population inversion of excited carbon dioxide molecules comprising:
   (a) combustion chamber having a solid fuel receiving portion
   (b) first oxygen supply means for supplying oxygen to said fuel receiving portion
   (c) second oxygen supply means for supplying oxygen to said combustion chamber at a point downstream from said fuel receiving portion
   (d) nitrogen supply means for providing nitrogen to said combustion chamber at a point downstream from said second oxygen supply means and
   (e) outlet means on said combustion chamber located downstream from said nitrogen supply means.

2. The apparatus of claim 1 further comprising a solid fuel element consisting of tetracyanoethylene in said fuel receiving portion, said tetracyanoethylene being configured to permit oxygen from said first oxygen supply means to flow across the surface of said fuel element and into the combustion chamber.

3. The apparatus of claim 1 further comprising means for supplying hydrogen to said grain receiving portion and means for igniting the hydrogen, oxygen mixture so produced.

4. The apparatus of claim 1 further comprising turbulence increasing means located within said combustion chamber.

5. The apparatus of claim 4 further comprising means for varying the flow rate of gases through each of said oxygen, nitrogen, and hydrogen supply means.

References Cited

UNITED STATES PATENTS

| | | | |
|---|---|---|---|
| 3,267,672 | 8/1966 | Craig et al. | 60—256 X |
| 3,446,017 | 5/1969 | Bender et al. | 60—256 X |

HARVEY E. BEHREND, Primary Examiner

U.S. Cl. X.R.

60—219, 256